(No Model.) 3 Sheets—Sheet 3.

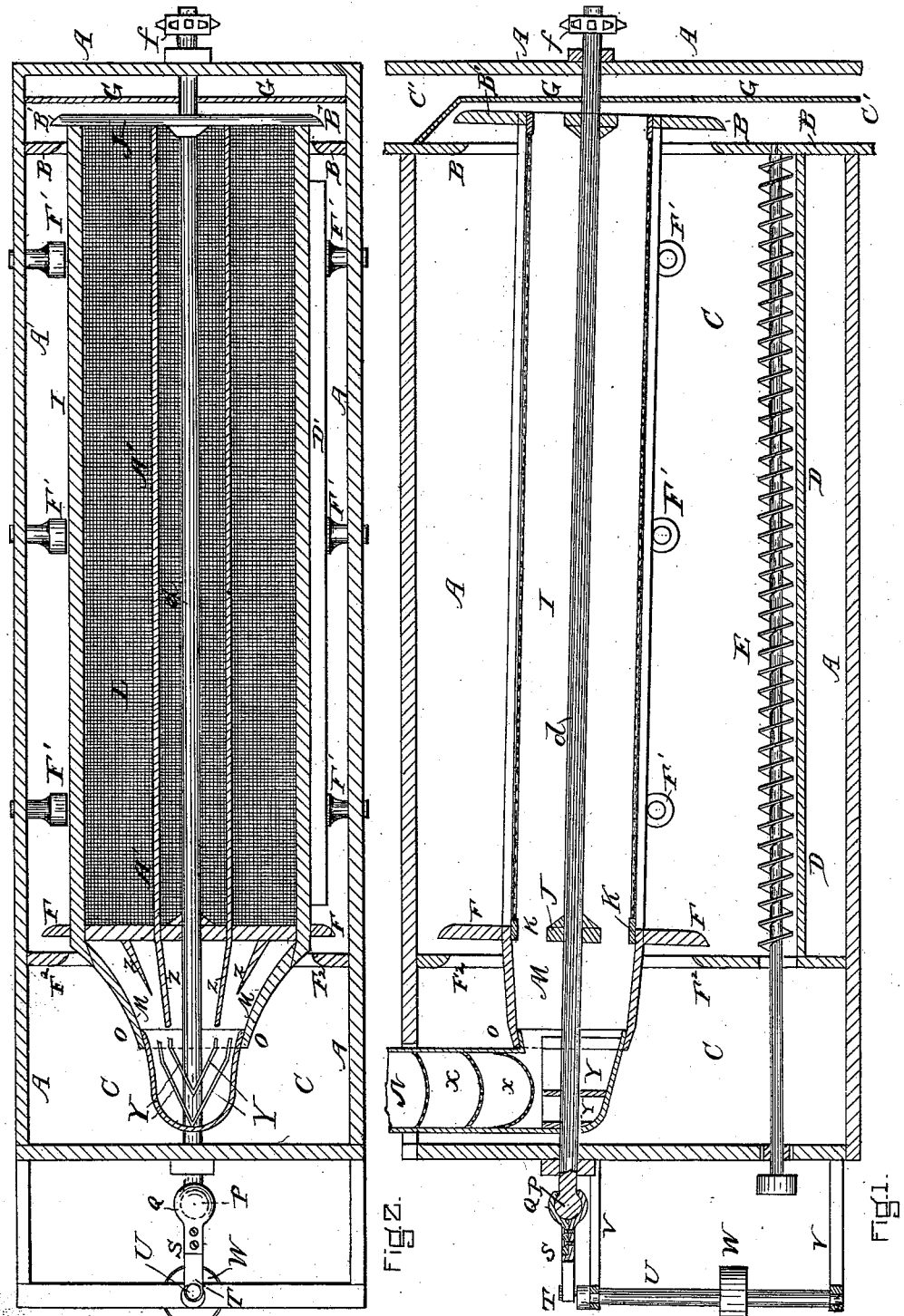

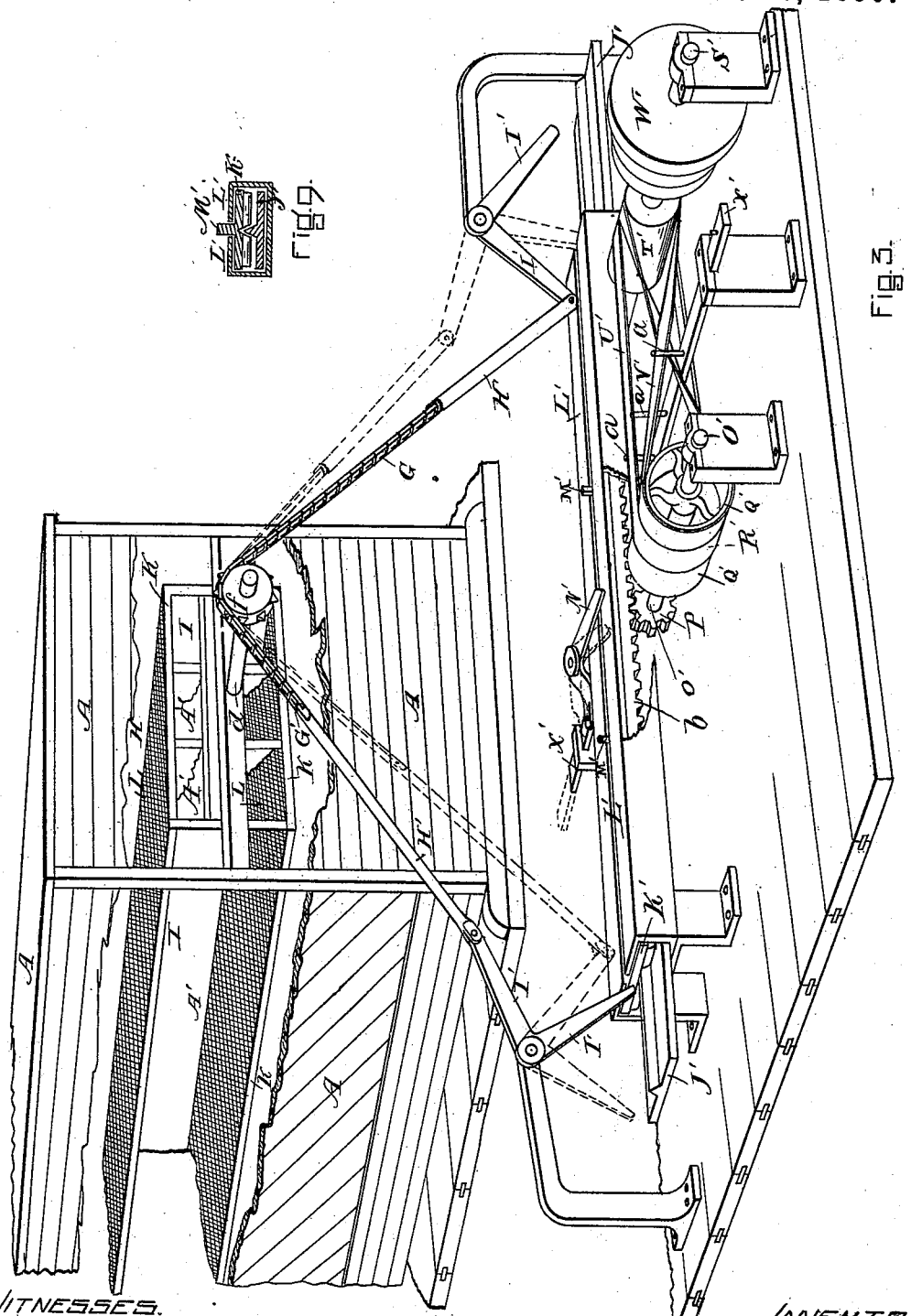

J. T. LEE.
COMBINED SHAKING AND REVOLVING BOLT.

No. 423,783. Patented Mar. 18, 1890.

WITNESSES:
Allen S. Pattison
E. S. Ellis

INVENTOR
J. Thomas Lee
per F. A. Lehmann
Atty.

UNITED STATES PATENT OFFICE.

JULIUS THOMAS LEE, OF BOSTON, MASSACHUSETTS.

COMBINED SHAKING AND REVOLVING BOLT.

SPECIFICATION forming part of Letters Patent No. 423,783, dated March 18, 1890.

Application filed June 14, 1889. Serial No. 314,247. (No model.)

*To all whom it may concern:*

Be it known that I, JULIUS THOMAS LEE, of Boston, in the county of Suffolk and State of Massachusetts, have invented certain new and useful Improvements in Combined Shaking and Revolving Bolts; and I do hereby declare the following to be a full, clear, and exact description of the invention, such as will enable others skilled in the art to which it pertains to make and use it, reference being had to the accompanying drawings, which form part of this specification.

My invention relates to an improvement in combined shaking and revolving bolts; and it consists in the construction and arrangement of parts more fully described hereinafter, and particularly pointed out in the claims.

The objects of my invention are to produce a combined shaking and revolving bolt composed of upper and lower screens, which are alternately and automatically brought into use; to so construct the bolt or reel that it is adapted to bolt and purify any material desired; to provide devices for feeding the material evenly to the mouth of the screen and then distribute it evenly over the surface thereof; to provide the screen with interior devices for causing the material that is within the screen and being operated upon to fall evenly upon the surfaces of the screens as they are alternately brought into use by partially revolving them, and to provide a bolt of this description with other details of construction for the specific purpose hereinafter described.

Figure 4:
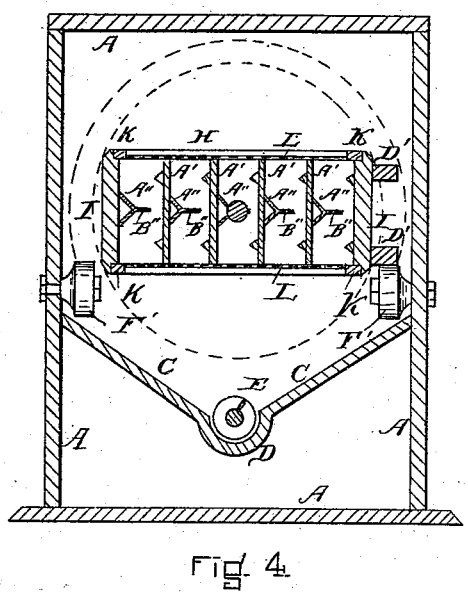
Figure 5:
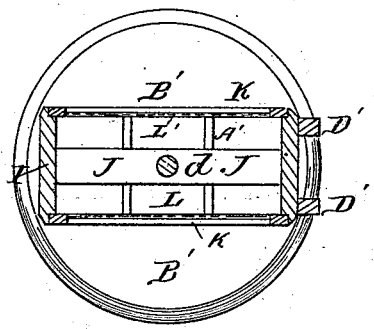
Figure 6:
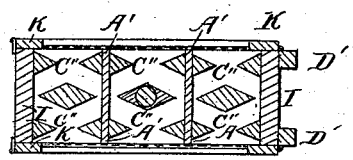
Figure 7:
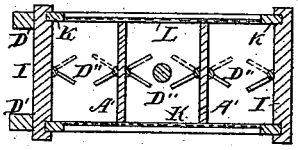
Figure 8:
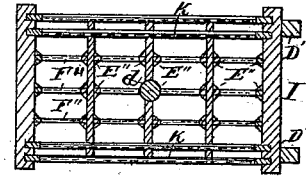
Figure 11:
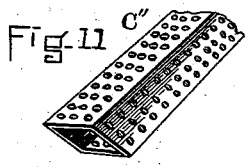
Figure 10:
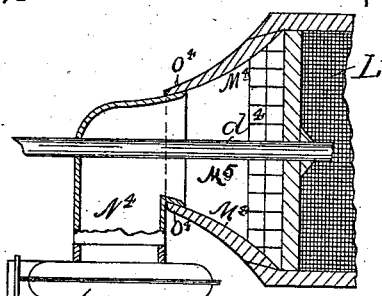

Figure 1 is a longitudinal vertical section of a bolt embodying my invention. Fig. 2 is a longitudinal horizontal section of the same, the automatic revolving mechanism being omitted. Fig. 3 is a perspective of the lower end of the bolting-chest and of the automatic revolving mechanism, the bolting-chest being broken away so as to show the bolting-reel supported therein. Fig. 4 is a vertical cross-section of the bolting-chest and bolt or reel therein. Fig. 5 is a view of the lower end of the bolt alone, showing the wheel which is placed thereon. Fig. 6 is a vertical cross-section of the bolt, showing rigid diamond or V shaped cant or deflecting boards. Fig. 7 is a similar view of the bolt, showing hinged cant or deflecting boards. Fig. 8 is also a similar view of the bolt, showing a number of screens and parallel horizontal perforated partitions, together with rigid deflecting-boards. Fig. 9 is a vertical cross-section of the segmental bar, its track, and cover. Fig. 10 is a horizontal section of the rear end of the screen, showing a spout and suction-fan connected thereto. Fig. 11 is an enlarged detached perspective of one of the devices C'', showing it formed of perforated metal.

The bolt or reel is placed and supported within a chest A of any desired approved shape or form, and the rear end of the chest provided with an apertured vertical partition B, through which aperture or opening the lower end of the bolt passes. This partition B forms the rear end of a receptacle for the bolted material, the sides of which are formed by the inclined boards C, which extend to the center of the chest and are connected by the semicircular trough D. Placed within this trough D is a screw conveyer E, which conveys the bolted material therefrom into any desired receptacle. The forward end of this inclined receptacle is formed by the vertical partition F², secured within the chest A near its forward end, and is provided with an opening of suitable size, through which the front end of the bolt passes. Fastened to the partition B at or near its upper end is the downwardly-extending hood G, which is provided for a purpose hereinafter described.

H indicates the bolting-reel, which is composed of the solid sides I, that are rigidly connected by the end cross connecting-piece J. Formed in the inner lower and upper edges of the sides I are longitudinal grooves, into which fit and slide the screen-frames K. To the frames K the screens L, of any approved or desired material, are suitably secured and removed from the bolt-frame by removing the screen-frames K K. By making the bolt of this construction it can be readily and quickly adapted to bolting and purifying all kinds of material by removing the screens and placing others in their stead, in which the mesh or perforations are of the proper size for the particular kind of material being operated upon. Should it be desired, however, the screen-frames may be secured to the sides of the bolting-frame by means of hooks, as shown in Fig. 6, instead of sliding in grooves made in the bolting-frame, as heretofore described.

Passing longitudinally through the bolt is the driving and supporting shaft $d$, which is secured to the end pieces J of the bolting-frame, so that the bolt will vibrate and revolve with it for the purpose of shaking the material placed therein and to alternately bring into operation the upper and lower screens. The rear end of this shaft $d$ passes through the hood G, and is supported in a suitable bearing secured to the rear end of the bolting-chest, and in which the shaft freely moves back and forth and revolves.

Connected to the front end of the bolting-frame is the short spout M, which is connected to the horizontal portion of the elbowed feeding-spout N by a loose joint O, as shown, which allows the bolt or reel to freely revolve and vibrate within the frame. The upper end of the feeding-spout will be connected to the receptacle from which the material is passing into it by a flexible connection of any desired construction or form. As shown, the shaft $d$ passes entirely through the bolt longitudinally, through the spout M and the elbow of the spout N, and has its front end supported in a suitable bearing which is fastened to the front end of the bolting-chest. Formed upon the front end of the shaft $d$ is a universal joint or ball P, which fits in a socket Q, made in the adjacent end of the pitman S. This construction allows the shaft to freely revolve and the pitman to vibrate, so that the bolt can be revolved as desired, while it at the same time receives a shaking motion. The opposite front end of the pitman S is connected to an eccentric or crank T, secured to the adjacent end of the driving-shaft U. Extending outward from the front end of the chest A are the supporting arms or brackets V, upon which the driving-shaft U is journaled, carrying a driving-pulley W.

Secured within the vertical feeding-spout are a suitable number of circular sieves X, which are sagged, as shown. These sieves serve to spread the material which is passing through the spout crosswise the spout M, so that it will drop evenly between the vertical partitions or V-shaped plates Y, placed within the spout below the said sieves. These plates or partitions Y, together with the vertical partitions Z in the spout M, spread the material evenly over the surface of the lower screen. I preferably, though not necessarily, place within the bolt a suitable number of vertical partitions A', which keep the material spread evenly over the entire surface of the screen, and also prevent it from falling together upon the side of the bolt when it is being turned for the purpose of bringing the upper screen into operation.

B' indicates a circular rim or wheel, which is placed around the lower end of the bolting-frame and forms a guard for the purpose of preventing the material which passes out the end of the bolt from being dusted into the chest. As shown in Fig. 1, the bottom of the chest extends only to the partition B, so as to allow the material which comes from the end of the bolt and which falls between the rim or guard to pass off and away. The hood G extends over the end of the bolt and virtually closes the opening into the chest, so as to prevent any material which may come from above through the space or spout C' from being dusted into the chest and from becoming mixed with the material which is passing out of the end of the bolt between the guard and the hood.

Secured to one side of the bolting-frame are longitudinal stops D', which preferably extend the length of the frame and which alternately rest upon the wheels F', that are journaled upon suitable bolts or spindles which pass through the sides of the chest. These stops form rests for the bolt and support it in its proper position while it is moving back and forth, and at the same time gives the bolt a jar, thus loosening all of the material which may be sticking to the screen above.

I cause the bolt to be automatically turned half-way around for the purpose of bringing first one and then the other screen into operation by the following mechanism, (shown in Fig. 3,) the object of which will be hereinafter stated: Secured upon the rear end of the shaft L is a sprocket-wheel $f$, which is engaged by a sprocket-chain G'. Connected to the ends of this chain at their upper ends are the rods H', which have their lower ends connected to the upper arm of the bell-crank levers I'. These bell-crank arms I' are pivotally supported above the track J' a suitable distance and have their outer free ends engaged by the endwise-moving rack-bar K'. Formed upon the upper side of the track J' is a V-shaped guide, which engages a corresponding groove made in the under side of the rack-bar K', as shown. Placed over the rack-bar for the purpose of holding it down upon the track is a cover L', which is provided with an opening for the pins M' to travel in and which engages the free end of the bell-crank lever N'. Journaled in suitable bearings below the track J' is a shaft O', carrying a gear-wheel P', which engages the toothed under side of the rack-bar; also, secured to the shaft O' are the two fast pulleys Q' Q' and a loose pulley R', placed between them.

S' indicates a horizontal shaft, which is journaled below the track J' and provided with a pulley T', around which pass the two belts U' V', and with a driving cone-pulley W', by means of which the speed of the shaft S' is regulated.

X' is an endwise-sliding belt-shifter, which is provided with the pins or projections $a\ a\ a$ for shifting the belts, and with the pin $b$, engaging a slot made in one arm of the bell-crank lever N'.

The operation of the automatic shifting or revolving mechanism is as follows: Power is applied to the cone-pulley W' through the medium of a driving-belt and shaft S' caused to revolve, which in turn imparts a rotary motion to the shaft O', upon which is secured the gear-wheel P'. As the rack-bar J' is moved by the wheel P', one of its ends engages the free end of one of the bell-crank levers I' and forces it outward, drawing downward upon one of the rods H', and with it the chain G, which causes the bolt to revolve one-half way around, and rest, as shown in Fig. 4, upon the wheels F'. When the rack-bar J' has moved sufficiently far to thus revolve the bolt, one of the pins M' engages the free end of the bell-crank lever N' and moves it longitudinally and forces the belt-shifter X endwise, thus shifting the belts. The belt V', being crossed, as shown, revolves the shaft O' in the opposite direction from that given it by the belt U'. As the belts are shifted back and forth, one or the other of them is always upon the loose central pulley K', which does not affect the shaft O', while the belts U' and V' are alternately upon the fast pulleys Q' Q', respectively, thus causing the shaft O' to revolve in opposite directions as the belts are shifted, and thus move the rack-bar J' alternately in opposite directions and operating alternately the bell-crank levers I', whereby the bolt is revolved first in one direction and then in the opposite. The period of time between the revolutions given the bolt is regulated by moving the driving-belt back and forth upon the cone-pulley W'.

The object of revolving the bolt so as to bring first one screen and then the other into use is, that as the screen is shaken or vibrated the heavier, coarser material gets next to the screen and the light, fine material gets on top. When one screen has been in use long enough to cause this result, the bolt is given a half-revolution, so as to bring the opposite screen into use and to place the finer material at the bottom which was before on top and prevented from passing through the screen. This operation continues until the refuse material passes out at the opposite end of the bolt, by which time all of the fine material has been bolted and purified.

In order to prevent the material from falling in a heap or pile from one screen to the other when it is revolved, I provide, as shown in Figs. 4, 6, 7, and 8, cant-boards or deflecting and retarding devices, which I will now specifically describe. These devices retard the downward fall of the material and cause it to fall slowly and evenly upon the face of the screen, giving that portion of the material which falls first an opportunity to pass through before it is crowded by the weight of all of the material that is in the screen. By this means the material is bolted and purified much quicker and produces a finer result.

The devices shown in Fig. 4 consist of the V-shaped portions A'', which are secured, as shown, to the sides of the bolting-frame and to the partitions A'. Extending outward from these V-shaped portions any suitable distance are the tongues B'', which are preferably perforated to allow the material to pass through upon the screen below. I preferably, though not necessarily, form these retarding devices of metal, and which extend the entire length of the bolt, as do also the other devices, which are for the same purpose, and of which a description is hereinafter given.

In Fig. 6 a number of cant-boards or deflecting and retarding devices C'' are shown, and these devices are of a diamond or V shape, and are secured to the ends of the bolting-frame and to the opposite sides of the vertical portions A'. They are here shown as being formed of solid pieces of wood; but this may be formed of metal as well, and when some kinds of material are being operated upon, if desired, may be perforated, as shown in Fig. 11, to allow it to pass through them. In Fig. 7 these deflecting cant-boards D'' are hinged to the inner side of the bolting-frame and to opposite sides of the vertical partitions. They are preferably perforated, as shown, though when certain kinds of material are being operated upon it will probably be found desirable to have them solid. It will be readily understood that the devices fall of their own weight into the positions shown in dotted and solid lines as the bolt is being partially revolved in opposite directions, so as to cause the material to be thrown inward and spread evenly over the surface of the screen.

I show in Fig. 8 two screen-frames K and screens L, instead of one, which will be found very desirable when a very fine grade of bolted and purified material is wished. While only two screens are here shown upon top and bottom of the bolting-frame, as many as may be desired can be used to suit the particular kind of work being done. In addition to the deflecting-boards E'', which are similar in form and operation to those shown in Fig. 6, there is secured to the sides of the bolting-frame and vertical partitions A' a series of horizontal perforated partitions F'', which extend lengthwise the frame and its entire length for the purpose of causing the material to fall more slowly and evenly upon the face of the screen than will be the case when they are not used. I show an annular guard F upon the front end of the bolting-frame similar to the one placed upon its rear end, and an apertured partition $F^2$, fastened within the chest adjacent thereto. These will be found desirable when operating upon particular kinds of material only, and hence may or may not be used. The opening made in the partition is sufficiently large to allow the bolting-frame to be freely revolved and shaken or vibrated.

While I here show an automatic mechanism for partially revolving the bolt periodically, it will be evident that in many instances (as, for instance, in small mills) it may be turned by hand through the medium of a crank placed upon the rear end of the shaft $d$ in place of the sprocket-wheel $f$, or in the rear of it. It is also evident that the screen may be used with or without the retarding and deflecting devices, the vertical partitions, and some smaller details of construction, which are desirable, though I do not limit myself to them nor to any particular form of them; and while I show the automatically-revolving mechanism attached to the opposite end of the shaft from the vibratory mechanism, I do not limit myself to this construction, for it can be attached to the same end of the shaft as the vibrating mechanism, as will be readily perceived, by extending that end of the shaft sufficiently to allow the sprocket-wheel to be attached to it between the universal joint and the adjacent end of the chest.

In the bolting of some kinds of material it will be found advantageous to connect to the rear end of the screen a spout $N^4$ in the same manner that the spout N is connected to the front end of the screen, except that the spout will be horizontal instead of vertical. In this case the partitions and sieves used in the front spout are omitted. Connected to the outer end of this spout by means of a flexible tube is a suction-fan $N^5$, which allows the sieve to shake and the suction-fan to remain stationary. $M^5$ is a coarse sieve, through which the tailings drop. Where this spout is connected, the rear end of the chest will be made nearly similar to the front end. The object of this spout is to draw off the dust and fluff which are contained in certain kinds of material, and it will be found to add to the quality of the material acted upon by reason of a constant draft through the screen, which removes the fine dust and fluff which would otherwise pass through with the refined material.

Having thus described my invention, I claim—

1. In a combined revolving and vibrating bolt, the combination, with the bolting-chest, of a bolt having top and bottom screens, a shaft to which it is secured and which is supported in bearings that allow it a revolving and vibrating motion, a driving-shaft having a crank, a pitman connected thereto at one end, and a universal joint connecting the pitman and the bolting-reel shaft, whereby the bolt is given a vibrating and at the same time allowed a revolving movement, for the purpose specified.

2. The combination, with the bolting-chest, of a bolting or reel frame placed therein and having top and bottom screens, a shaft passing horizontally through the frame of the bolt and rigidly secured thereto and through suitable bearings secured to the ends of the chest, which allow it a revolving and an endwise movement, and a feeding-spout which passes loosely through the chest and having a horizontal portion placed loosely within the mouth of the bolting-frame spout, whereby the frame is allowed a free revolution independent of the feeding-spout and feeding-spout and frame together a vibratory movement, substantially as shown.

3. The combination, with a bolting or reel frame having top and bottom screens adapted to be vibrated and revolved, of a feeding-spout loosely connected therewith at its front end, and screens and vertical angular dividing-plates which diverge toward the screen placed within the spout, whereby the material passing through the spout is spread horizontally as it passes to the lower screen, substantially as specified.

4. The combination, with a bolting-frame adapted to be revolved and vibrated, having top and bottom screens and a mouth, suitable supports therefor, a feeding-spout loosely connected with the bolt, and dividing vertical partitions placed in the mouth, connecting the bolting-frame and the lower end of the feeding-spout, whereby the material is fed evenly over the surface of the lower screen, substantially as set forth.

5. The combination, in a bolting-frame having suitable supports, whereby it is adapted to be vibrated and revolved, of a feeding-spout having its lower end swiveled to the frame, and a suitable number of vertical longitudinal partitions secured to the interior of the bolting-frame, whereby it is divided into compartments and the material prevented from piling up when the frame is partially revolved, substantially as set forth.

6. The combination, in a bolting frame or reel adapted to be revolved and vibrated, having top and bottom screens, suitable supports and bearings therefor, a feeding-spout loosely connected therewith, longitudinal vertical partitions secured within the frame, and retarding or deflecting devices secured to the interior of the frame, for the purpose specified.

7. The combination, in a bolting-frame adapted to be revolved and vibrated, having top and bottom screens, suitable supports and bearings therefor, a feeding-spout loosely connected therewith, longitudinal vertical partitions within the frame, and horizontal longitudinal perforated partitions for retarding the fall of the material when the frame is partially revolved, substantially as described.

8. In a revolving and vibrating bolt, the combination, with the chest, of a bolting-frame supported therein and provided with suitable bearings and supports, a longitudinal stop or stops secured to the side of the frame, and wheels journaled to the inner sides of the chest, upon which the stop or stops rest, substantially as shown, and for the purpose described.

9. In a revolving and vibrating bolt, the combination, with the chest, of a bolting-frame supported therein and provided with suitable supports and bearings, and an annular flange or guard secured to its lower rear end, and a vertical partition provided with an opening, through which the back of the bolting-frame passes, and which is secured to the interior of the chest in front of the annular guard, for the purpose specified.

10. A revolving and vibrating bolt having top and bottom screens, in combination with the chest, in which it is supported and journaled so as to allow it to vibrate and revolve, a feeding-spout loosely connected therewith at its front end, an annular flange or guard connected to its rear end, a vertical partition secured to the interior of the chest in front of the guard and having an opening, through which the frame freely passes, and a hood fastened above the guard and extending downward over and below it, substantially as shown, and for the purpose set forth.

11. In a revolving and vibrating bolting-frame having top and bottom screens, the combination of a chest in which it is supported, journals secured to the frame at each end, bearings in which they revolve and vibrate, a vibrating mechanism connected to one end by a universal joint, and a mechanism for automatically partially revolving the frame, substantially as specified.

12. The combination, with a bolting-frame having top and bottom screens, a shaft passing through and secured thereto, of a vibratory mechanism connected to the shaft, a belt engaging the shaft or sprocket-wheel thereon, bell-crank levers, to which the ends of the belt are attached, and a reciprocating bar which engages alternately the free ends of said cranks, whereby the frame is given alternately a partial revolution, for the purpose specified.

13. The combination, with a bolting-frame adapted to be vibrated and revolved, having top and bottom screens, of a supporting-shaft secured therein, the chest having bearings for the shaft, a belt or chain engaging the pulley or sprocket-wheel on the shaft, bell-crank levers, to one arm of which the ends of the belt are attached, a reciprocating toothed bar, a revolving shaft having a wheel which engages the toothed bar, loose and fast pulleys secured to said shaft, and belts revolving in opposite directions engaging the said pulleys alternately, whereby the reciprocating bar is made to engage alternately the bell-crank levers and partially-revolving frame, substantially as shown.

14. The combination, with the shaft of a bolting-frame adapted to be revolved and vibrated, of the frame having top and bottom screens, a belt engaging a pulley or sprocket-wheel on said shaft, bell-crank levers, to which the ends of the belt are connected, a reciprocating toothed bar, a revolving shaft, a gear secured thereto engaging the toothed bar, a loose and fast pulley placed thereon, and a driving-shaft having a cone-pulley, and a pulley carrying two belts, which engage alternately the said fast and loose pulleys, one of the belts being crossed, for the purpose described, and a device for shifting said belts operated alternately by the reciprocating bar, substantially as and for the purpose set forth.

15. The combination, with a bolting-frame shaft adapted to be revolved and vibrated, the frame secured thereto having top and bottom screens, of a belt or chain engaging the pulley or sprocket-wheel on said shaft, bell-crank levers, to which the ends of the belt or chain are connected, a reciprocating toothed bar, a shaft having a gear-wheel which engages the said toothed bar, and loose and fast pulleys, a driving-shaft, two belts connecting the driving-shaft and said pulleys, one of the belts being crossed, a reciprocating bar having projections which engage the belts, a bell-crank lever having one arm loosely connected with said bar, and pins or projections upon the toothed bar, which alternately engage the free end of said lever, whereby the bar is moved endwise, the belts shifted, and the revolution of the gear-wheel reversed, all combined to operate in the manner and for the purpose described.

16. The combination, with the bolting-chest, of a bolting or reel frame placed therein, a shaft passing horizontally through the frame of the bolt and rigidly secured thereto and through suitable bearings secured to the ends of the chest, which allow it a revolving and endwise movement, a feeding-spout loosely connected to the front end of the frame, a spout loosely connected to the rear end of the frame, a suction-fan, and a flexible tube connecting the spout and the fan, for the purpose described.

In testimony whereof I affix my signature in presence of two witnesses.

J. THOMAS LEE.

Witnesses:
J. LORING THAYER,
N. WALLACE PAINE.